United States Patent
An et al.

(10) Patent No.: US 12,152,520 B2
(45) Date of Patent: Nov. 26, 2024

(54) UREA PUMP, AND CONTROL METHOD AND CONTROL SYSTEM FOR UREA PUMP

(71) Applicant: WEICHAI POWER CO., LTD, Shandong (CN)

(72) Inventors: Lihua An, Shandong (CN); Weida Liu, Shandong (CN); Junpu Li, Shandong (CN); Guopeng Li, Shandong (CN)

(73) Assignee: WEICHAI POWER CO., LTD, Shandong (CN)

( * ) Notice: Subject to any disclaimer, the term of this patent is extended or adjusted under 35 U.S.C. 154(b) by 0 days.

(21) Appl. No.: 18/276,919

(22) PCT Filed: Dec. 29, 2022

(86) PCT No.: PCT/CN2022/143428
§ 371 (c)(1),
(2) Date: Aug. 11, 2023

(87) PCT Pub. No.: WO2023/125819
PCT Pub. Date: Jul. 6, 2023

(65) Prior Publication Data
US 2024/0125262 A1    Apr. 18, 2024

(30) Foreign Application Priority Data

Dec. 29, 2021 (CN) .......................... 202111643374.1

(51) Int. Cl.
*F01N 3/20* (2006.01)
(52) U.S. Cl.
CPC ............ *F01N 3/206* (2013.01); *F01N 3/2066* (2013.01); *F01N 3/208* (2013.01); *F01N 2610/02* (2013.01); *F01N 2610/1406* (2013.01)

(58) Field of Classification Search
CPC ........ F01N 3/206; F01N 3/2066; F01N 3/208; F01N 2610/02; F01N 2610/1406
See application file for complete search history.

(56) References Cited

U.S. PATENT DOCUMENTS

| 8,680,437 B2 * | 3/2014 | Starck .................. F01N 3/2066 219/205 |
| 2010/0095653 A1 | 4/2010 | Thiagarajan et al. |
| 2011/0056961 A1 | 3/2011 | Amtmann et al. |

FOREIGN PATENT DOCUMENTS

| CN | 102197201 A | 9/2011 |
| CN | 102202759 A | 9/2011 |

(Continued)

OTHER PUBLICATIONS

International Search Report for International Application No. PCT/CN2022/143428; Date of Mailing, Feb. 10, 2023.

*Primary Examiner* — Audrey B. Walter
(74) *Attorney, Agent, or Firm* — CANTOR COLBURN LLP

(57) ABSTRACT

A urea pump, and a control method and control system for the urea pump are described. The urea pump comprises: a liquid intake pipeline; an instant heating type filtering device, an inlet of the instant heating type filtering device being in communication with a urea tank via the liquid intake pipeline, and the instant heating type filtering device being configured to filter and heat a urea solution flowing in through the inlet pipeline; a pressure build-up pump arranged at the inlet pipeline and configured to drive the urea solution flowing to the instant heating filtering device through the liquid intake pipeline; a liquid output line in communication with a first outlet of the instant heating filtering device and configured to deliver a filtered and heated urea solution to a nozzle; and a liquid return pipeline.

11 Claims, 3 Drawing Sheets

(56) References Cited

FOREIGN PATENT DOCUMENTS

| | | | |
|---|---|---|---|
| CN | 202036861 U | 11/2011 | |
| CN | 202402109 U | 8/2012 | |
| CN | 109252924 A * | 1/2019 | ............. F01N 3/206 |
| CN | 111365096 A * | 7/2020 | ............. F01N 3/208 |
| CN | 112682133 A | 4/2021 | |
| CN | 114483262 A | 5/2022 | |
| KR | 20180023600 A | 3/2018 | |
| WO | WO-2010049208 A1 * | 5/2010 | ............. B01D 35/18 |

* cited by examiner

UREA PUMP, AND CONTROL METHOD AND CONTROL SYSTEM FOR UREA PUMP

CROSS REFERENCE TO RELATED APPLICATIONS

This is the U.S. national stage of application No. PCT/CN2022/143428, filed on Dec. 29, 2022. Priority under 35 U.S.C. § 119 (a) and 35 U.S.C. § 365 (b) is claimed from Chinese Application No. 202111643374.1 filed Dec. 29, 2021, the disclosure of which is also incorporated herein by reference.

FIELD

The present disclosure relates to the technical field of vehicle exhaust gas treatment, and in particular to a urea pump, and a control method and a control system for a urea pump.

BACKGROUND

A urea pump is a core component of the SCR (Selective Catalytic Reduction) urea injection system. With the urea pump, the urea is enabled to be fed to a urea nozzle under a certain pressure and the required injection volume is enabled to be exactly performed to ensure that the emission meets regulatory requirements.

A conventional urea pump mainly functions to provide urea with a certain pressure to the urea nozzle. The urea can be unfrozen successfully at a low temperature, and thus the urea with a higher temperature cannot be provided. However, after the urea at the room temperature reaches the nozzle and then injected into an assembly, the urea is not well atomized, easily leading to crystallization. If the urea is heated before entering the urea pump, the urea is prone to deterioration, resulting in low conversion efficiency and the formation of unwanted chemical components.

SUMMARY

A urea pump, a control method and a control system for a urea pump, capable of solving the problem of poor atomization of the urea at the room temperature after being injected from a nozzle to an assembly, which is easily leading to crystallization, are provided according to the present disclosure.

According to a first aspect of the present disclosure, a urea pump is provided. The urea pump includes: an inlet pipeline: an instant-heating filtering device, where an inlet of the instant-heating filtering device is in communication with a urea tank through the inlet pipeline, and the instant-heating filtering device is configured to filter and heat a urea solution flowing in through the inlet pipeline: a pressure build-up pump, arranged in the inlet pipeline and configured to drive the urea solution flowing to the instant-heating filtering device through the inlet pipeline: an outlet pipeline, in communication with a first outlet of the instant-heating filtering device and configured to feed the urea solution which is filtered and heated to a nozzle; and a return pipeline, in communication with a second outlet of the instant-heating filtering device and configured to feed the urea solution in the urea pump to the urea tank after shutdown of the urea pump.

In the urea pump according to the present disclosure, after the external urea solution flows into the urea pump, the urea solution can be filtered by an instant-heating filtering device and the urea solution can be heated up to the first predetermined temperature so that the urea solution has a higher temperature and passes through the output pipeline and is immediately sprayed from the nozzle, enabling the urea solution to be sprayed from the nozzle in a higher temperature state, thereby improving the atomization effect of the urea solution and reducing the probability of crystallization of the urea solution. It should also be noted that the urea solution is heated by the instant-heating filtering device and then immediately sprayed from the nozzle, the urea solution at a higher temperature is retained in the urea pump for a short time period, which reduces the degree of deterioration of the urea solution and reduce the formation of unwanted chemical components and ensures a high conversion rate of the urea solution after being sprayed from the nozzle.

In addition, the urea pump according to the present disclosure may have the following additional technical features.

In some embodiments of the present disclosure, the instant-heating filtering device includes: a housing, where a cavity is defined in the housing: a filtering member, filled in the cavity for filtering the urea solution flowing through the cavity; and an electrical heating member, arranged inside the cavity for heating the urea solution flowing into the cavity; where the inlet pipeline, the return pipeline and the outlet pipeline each is in communication with the cavity:

In some embodiments of the present disclosure, the return pipeline includes a main pipeline, and a first branch pipeline and a second branch pipeline which are connected in parallel and connected to the main pipeline; and the urea pump further includes: a relief valve, arranged in the first branch circuit: a return pump, arranged in the second branch circuit; and a pressure sensor, arranged in the outlet pipeline.

According to a second aspect of the present disclosure, a control method for a urea pump is provided. The control method is configured to control operation of the urea pump according to the technical solutions in the first aspect, and the control method includes:

obtaining an initial temperature of the urea pump: controlling a pressure build-up pump to build up pressure in response to the fact of the initial temperature being higher than a first threshold value: obtaining an injection request and a required injection volume; and controlling the instant-heating filtering device to operate for a first time period and to heat up to a first predetermined temperature, based on the injection request and the required injection volume.

In the control method for a urea pump according to the present disclosure, by controlling the instant-heating filtering device to operate for the first time period and to heat up to the first predetermined temperature based on the required injection volume, it can be ensured that the instant-heating filtering device can heat the urea solution flowing through the interior of the instant-heating filtering device up to the first predetermined temperature, so that the urea solution is sprayed from the nozzle in a state of the first predetermined temperature, thereby allowing the urea solution to be sprayed from the nozzle in a state of a higher temperature. This improves the atomization effect of the urea solution and reduces the probability of crystallization of the urea solution.

In some embodiments of the present disclosure, before the controlling a pressure build-up pump to build up pressure in response to the fact of the initial temperature being higher than a first threshold value, the method further includes: controlling the instant-heating filtering device to operate and heat up to a second predetermined temperature, in response to the initial temperature being less than or equal to the first threshold value; where the second predetermined temperature is higher than the first threshold value.

In some embodiments of the present disclosure, the first predetermined temperature ranges from 80° C. to 150° C.

In some embodiments of the present disclosure, the first threshold value is a freezing point temperature of the urea solution, and the first threshold value ranges from −8° C. to −6° C.

In some embodiments of the present disclosure, the required injection volume is proportional to the first time period.

In a third aspect of the present disclosure, a control system for a urea pump is provided. The control system is configured to implement the control method according to the technical solutions of the second aspect, and the control system for a urea pump includes:

a first obtaining unit, configured to obtain an initial temperature of the urea pump; a second obtaining unit, configured to obtain an injection request and a required injection volume; and a control unit, configured to control the pressure build-up pump to build up pressure in response to the fact of the initial temperature being higher than a first threshold value, where the control unit is further configured to control, based on the injection request and the required injection volume, the instant-heating filtering device to operate for a first time period and to heat up to a first predetermined temperature.

In the control system for a urea pump according to the present disclosure, the control unit controls the pressure build-up pump to build up pressure in response to the fact of the initial temperature being higher than a first threshold value to avoid blockage of the urea pump due to freezing when the urea solution flows into the interior of the urea pump, and the control unit further controls the instant-heating filtering device to operate for the first time period and to heat up to the first predetermined temperature based on the injection request and the required injection volume, so that the urea solution is sprayed from the nozzle in a state of the first predetermined temperature, thereby allowing the urea solution to be sprayed from the nozzle in a state of a higher temperature. This improves the atomization effect of the urea solution and reduces the probability of crystallization of the urea solution.

In some embodiments of the present disclosure, the control unit is further configured to control the instant-heating filtering device to operate and to heat up to a second predetermined temperature, in response to the fact of the initial temperature being less than or equal to the first threshold value; where the second predetermined temperature is higher than the first threshold value.

BRIEF DESCRIPTION OF THE DRAWINGS

Throughout the accompanying drawings, the same components are indicated by the same reference numerals. In the accompanying drawings.

Figure 1:
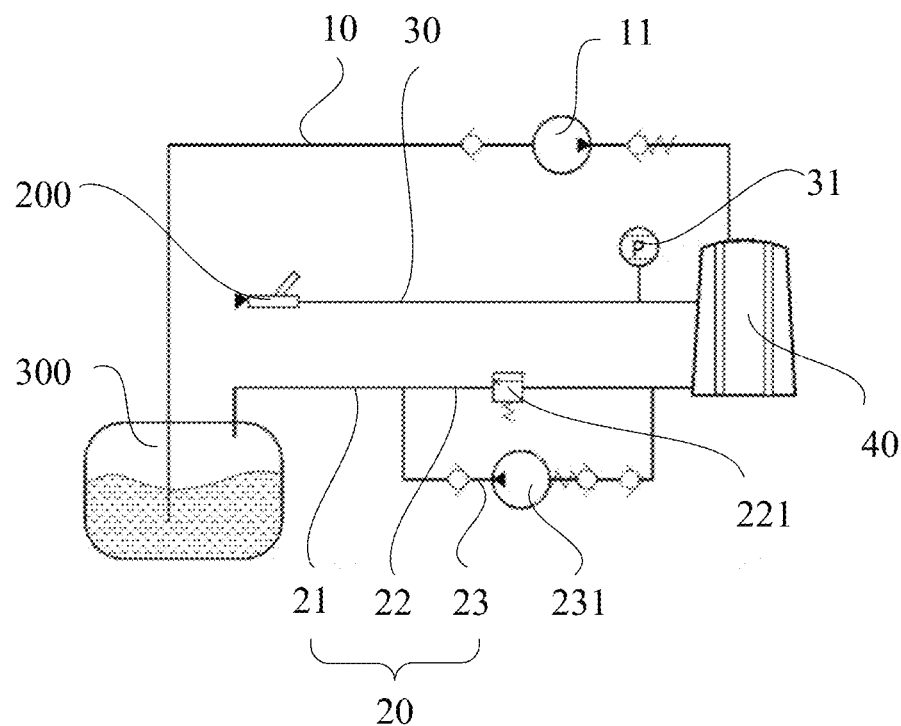
FIG. 1 schematically shows a schematic structural diagram of a urea pump according to an embodiment of the present disclosure.

The reference numerals are listed as follows:

10 inlet pipeline,
11 pressure build-up pump,
20 return pipeline,
21 main pipeline,
22 first branch pipeline,
221 relief valve,
23 second branch pipeline,
231 return pump,
30 outlet pipeline,
31 pressure sensor,
40 instant-heating filtering device,
41 housing,
42 filtering member,
43 electric heating member,
44 cavity,
45 inlet,
46 first outlet,
47 second outlet,
100 control unit,
101 first obtaining unit,
102 second obtaining unit,
200 nozzle,
300 urea tank.

DETAILED DESCRIPTION OF THE EMBODIMENTS

It is to be understood that terms used herein are only for the purpose of describing particular exemplary embodiments and are not intended to be limiting. Unless the context clearly indicates otherwise, the singular forms "a", "one" and "the" as used herein may also mean including the plural forms. The terms "including", "comprising", "containing" and "having" are inclusive, and therefore indicate the existence of the stated features, steps, operations, elements and/or components, but do not exclude the existence or addition of one or more other features, steps, operations, elements, components, and/or combinations thereof. The methods, steps, processes and operations described herein are not interpreted as necessarily requiring them to be executed in the specific order described or illustrated, unless the execution order is explicitly indicated. It should be understood that additional or alternative steps may be used.

Although the terms, "first", "second", "third" and the like, may be used herein to describe various elements, components, regions, layers and/or segments, however, these elements, components, regions, layers and/or segments should not be limited by these terms. These terms may only be used to distinguish one element, component, region, layer or segment from another region, layer or segment. Unless the context clearly indicates, the use of terms such as "first", "second" and other numerical terms does not imply order or sequence when the terms are used herein. Therefore, a first element, component, area, layer or section discussed below could be referred as a second element, component, area, layer or section without departing from the teachings of exemplary embodiments.

For the convenience of description, spatial relative terms, such as "internal", "external", "inside", "outside", "below", "under", "above", and "over", can be used to describe the relationship between one element or feature as shown in the figure and another element or feature. The spatial relative terms are intended to include different orientations of the device in use or operation in addition to the orientations of the device depicted the drawings. For example, if the device in the figure is turned over, elements described as "below other elements or features" or "under other elements or features" will be oriented as "above other elements or features" or "over other elements or features". Therefore, the exemplary term "under" may include both upward and downward orientations. The device may be additionally oriented (rotated by 90 degrees or in other directions) and the spatial relative relationship descriptor used herein is interpreted accordingly.

Figure 2:
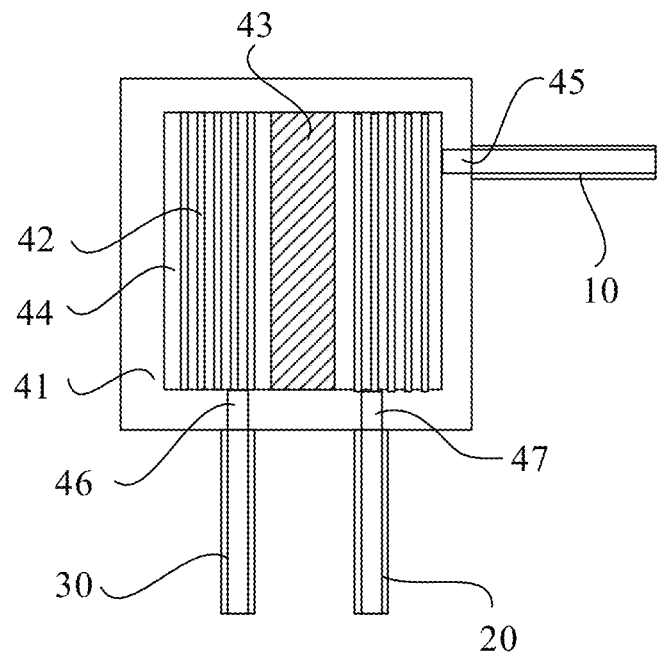
FIG. 2 schematically shows a schematic structural view of an instant-heating filtering device according to an embodiment of the present disclosure.

As shown in FIG. 1 and FIG. 2, a urea pump is provided according to an embodiment of the present disclosure. The urea pump includes: an inlet pipeline 10, a return pipeline 20, an outlet pipeline 30, a pressure build-up pump 11 and an instant-heating filtering device 40. One end of the inlet pipeline 10 is in communication with a urea tank 300, and the other end of the inlet pipeline 10 is in communication with an inlet 45 of the instant-heating filtering device 40. One end of the return pipeline 20 is in communication with the urea tank 300 and the other end of the return pipeline 20 is in communication with a second outlet 47 of the instant-heating filtering device 40. One end of the outlet pipeline 30 is in communication with a first outlet 46 of the instant-heating filtering device 40, and the other end of the outlet pipeline 30 is provided with a nozzle 200. The pressure build-up pump 11 is arranged in the inlet pipeline 10 and is configured to drive the urea solution in the urea tank 300 to flow into the urea pump through the inlet pipeline 10 and to enable the urea solution to flow through the instant-heating filtering device 40 under a certain pressure and then be sprayed out through the nozzle 200 in the outlet pipeline 30. The return pipeline 20 is used for the urea solution in the urea pump to flow back to the urea tank 300 through the return pipeline 20 after shutdown of an engine, so as to avoid the urea solution being retained inside the urea pump, which otherwise causes the urea pump to become blocked due to crystallization or due to the freezing of the urea solution at a low temperature. Specifically, the instant-heating filtering device 40 is configured to filter and heat the urea solution flowing into the interior of the instant-heating filtering device 40 to a first predetermined temperature, so that the urea solution is sprayed from the nozzle 200 at the first predetermined temperature, thereby allowing the urea solution to be sprayed from the nozzle 200 at a higher temperature, improving the atomization of the urea solution and reducing the probability of crystallization of the urea solution.

In addition, it should be noted that the urea solution is immediately sprayed from the nozzle 200 after being heated by the instant-heating filtering device 40. The urea solution at a higher temperature has a short retention time in the urea pump, which reduces the degree of deterioration of the urea solution, reduces the formation of unwanted chemical components, and ensures a high conversion rate of the urea solution after the urea solution being sprayed from the nozzle 200. The first predetermined temperature can be set according to actual requirements. For example, in an exemplary embodiment, the first predetermined temperature is set in a range of 80° C. to 150° C. Compared to the urea solution at the room temperature, the urea solution sprayed by the nozzle 200 at a temperature of 80° C. to 150° C. has a better atomization effect, which is less likely to crystallize on the nozzle 200 and has a higher conversion rate. It should be emphasized that with the urea pump according to the present disclosure, it is not required to change the overall design structure of a urea pump injection system, and the urea pump in the urea pump injection system of a conventional vehicle can be replaced, thereby enabling the urea pump according to the present disclosure to have a wider scope of disclosure.

In an embodiment, the instant-heating filtering device 40 includes: a housing 41, a filtering member 42 and an electric heating member 43. The interior of the housing 41 is hollow and a cavity 44 is formed therein. The inlet pipeline 10, the return pipeline 20 and the outlet pipeline 30 each is in communication with the cavity 44. The urea solution in the urea tank 300 flows into the cavity 44 through the inlet pipeline 10 and is sprayed out through the outlet pipeline 30. The return pipeline 20 is configured to feed the urea solution in the cavity 44, the inlet pipeline 10 and the outlet pipeline 30 to flow back into the urea tank 300 after shutdown of an engine. The electric heating member 43 is arranged inside the cavity 44, and the filtering member 42 fills the space in the cavity 44 except the space for the electric heating member 43 and can filter impurities in the urea solution flowing through the cavity 44 to prevent the urea solution from containing impurities, which will otherwise result in crystallization and the nozzle 200 being blocked. Specifically, the filtering member 42 can be made of industrial filter paper material for filtering the urea solution. The electric heating member 43 is configured to heat the urea solution flowing into the cavity 44, so that the urea solution is sprayed from the outlet pipeline 30 after being heated. In this embodiment, the electric heating member 43 includes an instant-heating electric heater for rapid heating of the urea solution flowing through the cavity 44.

In an exemplary embodiment, as shown in FIG. 2, the electric heating member 43 is arranged in the center of the cavity 44, and the space around the sides of the electric heating member 43 in the cavity 44 is filled with a filtering member 42 so as to enable the urea solution flowing through the cavity 44 to more fully contact the electric heating member 43 and to improve the heat exchange efficiency between the urea solution and the electric heating member 43.

In some embodiments of the present disclosure, the urea pump further includes: a relief valve 221, a return pump 231, a pressure sensor 31, a shut-off valve and a check valve. The return pipeline 20 includes a main pipeline 21, and a first branch pipeline 22 and a second branch pipeline 23 which are connected in parallel and connected to the main pipeline 21. The relief valve 221 is arranged in the first branch pipeline 22, the return pump 231 is arranged in the second branch pipeline 23, and the pressure sensor 31 is arranged in the outlet pipeline 30. The pressure sensor 31 is configured to detect the liquid pressure in the outlet pipeline 30. The return pump 231 is configured to empty the urea solution in the pipelines after shutdown of the engine, and the urea solution in the pipelines is sucked back into the urea tank 300. The relief valve 221 is configured to control the pressure in the outlet pipeline 30, and when excessive pressure is built by the pressure build-up pump 11, the urea solution in the pipeline can be overflowed and flow back to the urea pump, thereby reducing the pressure in the inlet pipeline 10, the outlet pipeline 30 and the cavity 44 and keeping the pressure within a reasonable range. The shut-off valve and the check valve are configured to prevent the urea solution from flowing backwards, which otherwise causes an imbalance in the pressure of the urea solution in the outlet pipeline 30, so that the pressure build-up pump 11 can build up a pressure properly.

Figure 3:
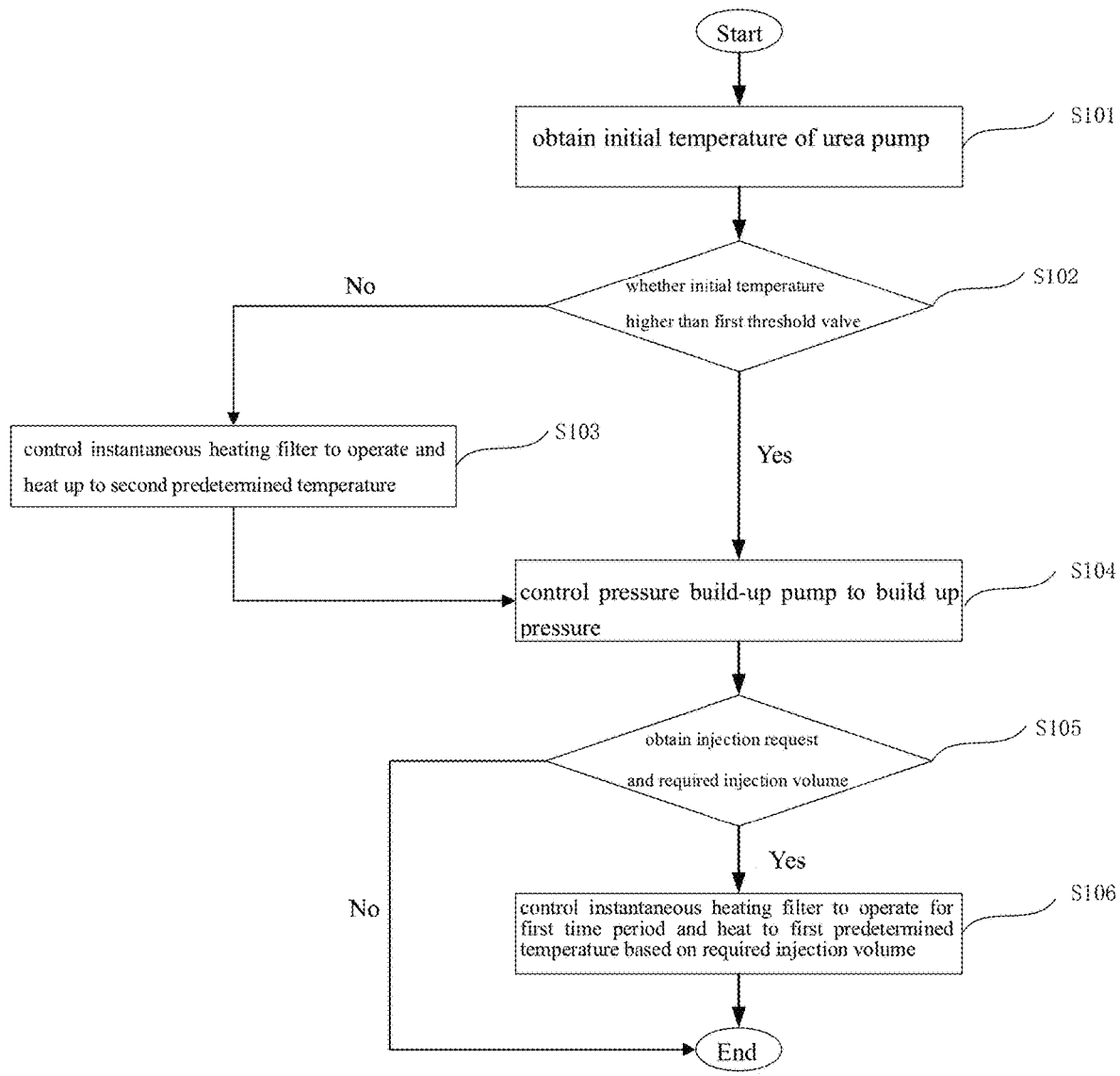
FIG. 3 schematically shows a flowchart of a control method for a urea pump according to an embodiment of the present disclosure.

A control method for a urea pump is provided according to technical solutions of a second aspect of the present disclosure. The control method is applied to control operation of the urea pump in the technical solutions of the first aspect, as shown in FIG. 3, the control method includes the following steps S101 to S106.

In step S101, an initial temperature of the urea pump is obtained.

In step S102, it is determined whether the initial temperature is higher than a first threshold value. Step S104 is performed in a case that the initial temperature is higher than the first threshold value, and step S103 is performed in a case that the initial temperature is not higher than the first threshold value.

In step S103, an instant-heating filtering device is controlled to operate and heat up to a second predetermined temperature.

In step S104, a pressure build-up pump is controlled to build up a pressure.

In step S105, it is determined whether an injection request and a required injection volume are obtained. Step S106 is performed in a case that the injection request and the required injection volume are obtained, and the processing of the method ends in a case that the injection request and the required injection volume are not obtained.

In step S106, the instant-heating filtering device is controlled to operate for a first time period and to heat up to a first predetermined temperature, based on the injection request and the required injection volume.

In this embodiment, the initial temperature of the urea pump is a temperature of the urea pump before the urea pump starts, and the first threshold value is the freezing temperature of the urea solution. There may be a risk of freezing of the urea solution flowing into the urea pump when the temperature of the urea pump is at the first threshold value. The freezing point of the current automotive urea solution is −11° C. To ensure that the urea pump does not become blocked due to freezing of the urea solution, the first threshold value in this disclosure ranges from −8° C. to −6° C. Thus, in step S102, if the initial temperature is higher than the first threshold value, the urea solution will not freeze in the urea pump, if the initial temperature is less than or equal to the first threshold value, there is a risk of the urea solution freezing in the urea pump. In step S103, the initial temperature being less than or equal to the first threshold value indicates that there is a risk of freezing when the urea solution flows into the urea pump. Therefore, the instant-heating filtering device is controlled to operate and heat up to the second predetermined temperature, in order to increase the temperature of the urea pump. The second predetermined temperature is higher than the first threshold value to avoid the urea solution from freezing when flowing into the urea pump and causing blockage of the urea pump. In step 104, when it is determined that the temperature of the urea pump is higher than the first threshold value, the pressure build-up pump is controlled to build up pressure so that the urea solution in the urea tank has the appropriate pressure when flowing into the inlet pipeline, the instant-heating filtering device and the outlet pipeline, thereby ensuring that when the nozzle is opened, the urea solution can be sprayed at the appropriate pressure to ensure good atomization effect. In steps S105 and S106, by obtaining the injection request and the required injection volume, the operation time of the instant-heating filtering device is determined based on the required injection volume to ensure that the instant-heating filtering device is able to heat the urea solution flowing through the interior to the first predetermined temperature, where the first predetermined temperature ranges from 80° C. to 150° C. Compared to the urea solution at the room temperature, the fact that the urea solution is sprayed from the nozzle at a temperature of 80° C. to 150° C. improves the atomization effect of the urea solution, reduces the probability of crystallization of the urea solution, and provides a high conversion rate.

In an exemplary embodiment, the required injection volume is proportional to the first time period. The greater the required injection volume is, the longer the time period in which the urea pump injects the urea solution is. Therefore, the first time period for heating the instant-heating filtering device is determined based on the injection time of the urea solution, to ensure that the entire urea solution has been heated up to the first predetermined temperature by the instant-heating filtering device during the injection of the urea solution. The electric heating element in the instant-heating filtering device is configured to heat the urea solution flowing through the interior of the instant-heating filtering device.

Figure 4:
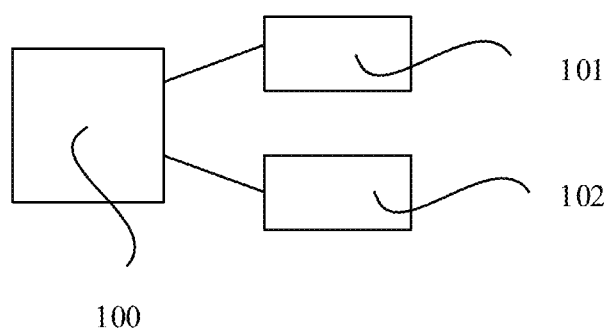
FIG. 4 schematically shows a schematic diagram of a control system for a urea pump according to an embodiment of the present disclosure.

A control system for a urea pump is provided according to technical solutions of a third aspect of the present disclosure. The control system is applied to implement the control method according to technical solutions of the second aspect. As shown in FIG. 4, the control system for a urea pump includes: a first obtaining unit 101, a second obtaining unit 102 and a control unit 100. The first obtaining unit 101 is configured to obtain an initial temperature of the urea pump, the second obtaining unit 102 is configured to obtain an injection request and a required injection volume; and the control unit 100 is configured to control the pressure build-up pump to build up pressure in response to the fact that the initial temperature is higher than a first threshold value. The control unit 100 is further configured to control the instant-heating filtering device to operate for a first time period and to heat up to a first predetermined temperature based on the required injection volume. The first obtaining unit 101 is configured as a temperature sensor, which is arranged inside the urea pump so that the initial temperature of the urea pump is measured. The second obtaining unit 102 obtains an original displacement of the engine, calculates the NOx value based on the original displacement and converts the NOx value into the required injection volume of the urea solution. Specifically, the control unit 100 is configured as an ECU (Electronic Control Unit) 100.

In some embodiments of the present disclosure, the control unit 100 is further configured to: control the instant-heating filtering device to operate and heat up to a second predetermined temperature which is higher than the first threshold value, in response to the fact that the initial temperature is less than or equal to the first threshold value, in order to prevent the urea solution from freezing when flowing into the urea pump and thus causing the blockage of the urea pump.

A vehicle with a urea pump and a control system for a urea pump is provided according to the present disclosure. The control method to the vehicle is as follows:

After the whole vehicle is powered on, the ECU will read the temperature of the urea pump to obtain the initial temperature and determine whether the urea pump is in a low temperature freezing state by comparing the initial temperature with the first threshold value (i.e. an unfreezing threshold value). If the temperature of the urea pump does not reach the first threshold value, the urea pump immediately turns on the instant-heating filtering device in order to quickly reach a set second predetermined temperature, where the second predetermined temperature is higher than the first threshold value. Subsequently, the urea pump starts to build up pressure. If the temperature has reached the first threshold value, the ECU sends a pressure build-up instruction to the urea pump for requesting the urea pump to build up the pressure. When the urea pump receives instruction of the required injection volume from the ECU, the urea pump turns on the instant-heating filtering device based on the value of the required injection volume, sets the time period for rapid heating (i.e. the first time period) and the first predetermined temperature based on the injection volume, while the urea pump executes the injection request normally.

The invention claimed is:

1. A urea pump, comprising:
   an inlet pipeline;
   an instant-heating filtering device, wherein an inlet of the instant-heating filtering device is in communication with a urea tank through the inlet pipeline, and the instant-heating filtering device is configured to filter and heat a urea solution flowing in through the inlet pipeline;
   a pressure build-up pump, arranged in the inlet pipeline and configured to drive the urea solution flowing to the instant-heating filtering device through the inlet pipeline;
   an outlet pipeline, in communication with a first outlet of the instant-heating filtering device and configured to feed the urea solution, which is filtered and heated, to a nozzle; and
   a return pipeline, in communication with a second outlet of the instant-heating filtering device and configured to feed the urea solution in the urea pump to the urea tank after shutdown of the urea pump, wherein the return pipeline comprises a main pipeline, and a first branch pipeline and a second branch pipeline which are connected in parallel and connected to the main pipeline; and
   wherein the urea pump further comprises:
   a relief valve, arranged in the first branch pipeline;
   a return pump, arranged in the second branch pipeline; and
   a pressure sensor, arranged in the outlet pipeline.

2. The urea pump according to claim 1, wherein the instant-heating filtering device comprises:
   a housing, wherein a cavity is defined in the housing;
   a filtering member, filled in the cavity for filtering the urea solution flowing through the cavity; and
   an electrical heating member, arranged inside the cavity for heating the urea solution flowing into the cavity; wherein
   the inlet pipeline, the return pipeline and the outlet pipeline each is in communication with the cavity.

3. A control method for a urea pump, configured to control operation of the urea pump according to claim 1, wherein the control method comprises following steps:
   obtaining an initial temperature of the urea pump;
   controlling the pressure build-up pump to build up pressure in response to the fact of the initial temperature being higher than a first threshold value;
   obtaining an injection request and a required injection volume; and
   controlling the instant-heating filtering device to operate for a first time period and to heat up to a first predetermined temperature based on the injection request and the required injection volume.

4. The control method for a urea pump according to claim 3, wherein before the controlling a pressure build-up pump to build up pressure in response to the fact of the initial temperature being higher than a first threshold value, the control method further comprises a following step:
   controlling the instant-heating filtering device to operate and heat up to a second predetermined temperature, in response to the fact of the initial temperature being less than or equal to the first threshold valve;
   wherein the second predetermined temperature is higher than the first threshold value.

5. The control method for a urea pump according to claim 3, wherein
   the first predetermined temperature ranges from 80° C. to 150° C.

6. The control method for a urea pump according to claim 3, wherein
   the first threshold value is a freezing point temperature of the urea solution, and the first threshold value ranges from −8° C. to −6° C.

7. The control method for a urea pump according to claim 3, wherein
   the required injection volume is proportional to the first time period.

8. The control method for a urea pump, configured to control operation of the urea pump according to claim 3, wherein the instant-heating filtering device comprises:
   a housing, wherein a cavity is defined in the housing;
   a filtering member, filled in the cavity for filtering the urea solution flowing through the cavity; and
   an electrical heating member, arranged inside the cavity for heating the urea solution flowing into the cavity; wherein
   the inlet pipeline, the return pipeline and the outlet pipeline each is in communication with the cavity.

9. The control method for a urea pump, configured to control operation of the urea pump according to claim 3, wherein the return pipeline comprises a main pipeline, and a first branch pipeline and a second branch pipeline which are connected in parallel and connected to the main pipeline; and
   wherein the urea pump further comprises:
   a relief valve, arranged in the first branch pipeline;
   a return pump, arranged in the second branch pipeline; and
   a pressure sensor, arranged in the outlet pipeline.

10. A control system for a urea pump, configured to implement the control method according to claim 3, wherein the control system for a urea pump comprises:
    a first obtaining unit, configured to obtain the initial temperature of the urea pump;
    a second obtaining unit, configured to obtain the injection request and the required injection volume; and
    a control unit, configured to control the pressure build-up pump to build up pressure in response to the fact of the initial temperature being higher than the first threshold value, wherein the control unit is further configured to control, based on the injection request and the required injection volume, the instant-heating filtering device to operate for the first time period and to heat up to the first predetermined temperature.

11. The control system for a urea pump according to claim 10, wherein
    the control unit is further configured to control the instant-heating filtering device to operate and to heat up to a second predetermined temperature, in response to the fact of the initial temperature being less than or equal to the first threshold value; wherein
    the second predetermined temperature is higher than the first threshold value.

* * * * *